United States Patent [19]

Schmidt et al.

[11] Patent Number: 4,856,728
[45] Date of Patent: Aug. 15, 1989

[54] PASSIVE SEAT BELT RETRACTOR ASSEMBLY

[75] Inventors: Timothy J. Schmidt, Troy; Valentim Jacob, Jr., Mt. Clemens, both of Mich.

[73] Assignee: General Safety Corporation, St. Clair Shores, Mich.

[21] Appl. No.: 170,776

[22] Filed: Mar. 21, 1988

[51] Int. Cl.⁴ .............................................. B60R 22/40
[52] U.S. Cl. .......................... 242/107.7; 242/107.4 A; 280/803; 280/807; 280/806
[58] Field of Search ............. 242/107.7, 107.6, 107.12, 242/107.4 A; 280/806, 807, 803; 297/478

[56] References Cited

U.S. PATENT DOCUMENTS

| | | | |
|---|---|---|---|
| 4,428,600 | 1/1984 | Doty | 242/107.6 X |
| 4,651,947 | 3/1987 | Tsukamoto | 242/107.7 |
| 4,757,954 | 7/1988 | Doty | 242/107.4 A |
| 4,763,853 | 8/1988 | Andersson | 242/107.4 A |

Primary Examiner—John M. Jillions
Attorney, Agent, or Firm—Harness, Dickey & Pierce

[57] ABSTRACT

A seat belt retractor assembly particularly adapted for mounting in a motor vehicle door as part of a passive belt system. The retractor includes both an inertia sensitive actuator and a tension relief or "comfort" features. The retractor further includes an operating system which renders the inertia sensitive actuator and comfort mechanism inoperative while the vehicle door is being opened or closed to allow the belt webbing to be freely withdrawn and retracted onto the retractor spool during such door movement. The operating system is actuated by an electrical solenoid. The force output and size of the electrical solenoid are minimized by employing a system which uses rotation of the retractor spool which "cocks" a latch plate member against spring tension and using the solenoid only to release the release plate when necessary.

13 Claims, 5 Drawing Sheets

PASSIVE SEAT BELT RETRACTOR ASSEMBLY

BACKGROUND AND SUMMARY OF THE INVENTION

This invention relates to an automotive seat belt retractor assembly and particularly to one useful for passive restraint systems of the type in which the retractor is mounted in the vehicle door.

In accordance with Federal Motor Vehicle Safety Standards (FMVSS) many passenger motor vehicles will soon be required to have passive restraint systems for front seat occupants. Such restraint systems provide impact protection without requiring the occupant to take steps to deploy the system. One type of passive restraint system is a so-called "automatic" seat belt. These systems position seat belt webbing across the occupant as they enter the vehicle so that the separate step of attaching a buckle fastener is unnecessary. In one type of automatic seat belt system, one or more seat belt retractors are mounted inside the vehicle door with one end of the webbing connected to an anchorage at the in-board side of the occupant seat. As the vehicle door is opened, the webbing spools out from the door mounted retractor, and becomes retracted when the door is closed.

Many modern day seat belt retractors are described as emergency locking retractor (ELR) types since they allow the webbing to be readily spooled out thus providing comfort and convenience for the occupants, but becomes locked to inhibit webbing payout when the vehicle is exposed to a deceleration force above a predetermined threshold. Typical ELR devices include a pendulum type inertia sensor.

In applications where a passive seat belt retractor with the emergency locking feature is mounted in the door, a means for locking out the inertia sensitive device is necessary to prevent the retractor from inhibiting payout of webbing upon opening of the door.

Modern day seat belt retractors are frequently also provided with a so-called "comfort" mechanism which prevents the retractor from constantly exerting a retracting force on the belt webbing which tends to be uncomfortable and annoying to occupants. The comfort mechanism includes a clutch or "window shade" type mechanism which allows the retractor to introduce slack in the webbing when the vehicle is being operated. These systems typically sense belt movement so that changes in direction of belt movement of certain magnitudes trigger the comfort mechanism to engage, and becomes cancelled by thereafter withdrawing the webbing. For in-door retractor applications, the comfort feature must be cancelled to allow the webbing to be retracted as the door is being closed. Engagement of the comfort feature in such situations could cause loose webbing to be closed into the door opening.

In view of the foregoing, there is a need to provide door mounted retractors of the type having emergency locking and comfort latching capabilities with a mechanism for rendering these systems inoperative during door opening and closing. In one prior art system, a mechanical door position sensing lever or button is provided which is mounted to the door and detects opening of the door. Movement of the sensing mechanism is communicated to the retractor through a mechanical cable. Although such systems generally perform satisfactorily, they have disadvantages in terms of their high cost and reliability. Accordingly, there is a need to provide an improved retractor operating mechanism of the above type.

The improved passive seat belt retractor assembly in accordance with this invention achieves the above mentioned desirable features through the use of an electrical solenoid actuated retractor operating mechanism. A door position switch is employed to energize the solenoid whenever the door is opened which serves to prevent engagement of the inertia sensitive lock mechanism and further cancels the comfort latching system while the door is open. As a means of reducing the size and cost of the actuation solenoid of the retractor, this invention uses a latching mechanism which causes a latch plate to become "cocked" during normal operation such that the solenoid merely serves to release the cocked latch plate which requires only a minimal force output.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIGS. 4 through 8 are cut-away frontal views of the retractor shown in FIGS. 1 through 3, showing the retractor operating mechanism in various phases of operation, in which FIG. 4 represents the position of the retractor operating mechanism when the door is opened, FIG. 5 shows the release plate being partially moved to a cocked position, FIG. 6 shows the release plate fully cocked with the comfort mechanism operational, FIG. 7 illustrates normal operation of the comfort mechanism, and FIG. 8 shows the solenoid actuator cancelling the comfort feature and preventing engagement of the inertia actuating mechanism.

DETAILED DESCRIPTION OF THE INVENTION

Figure 1:
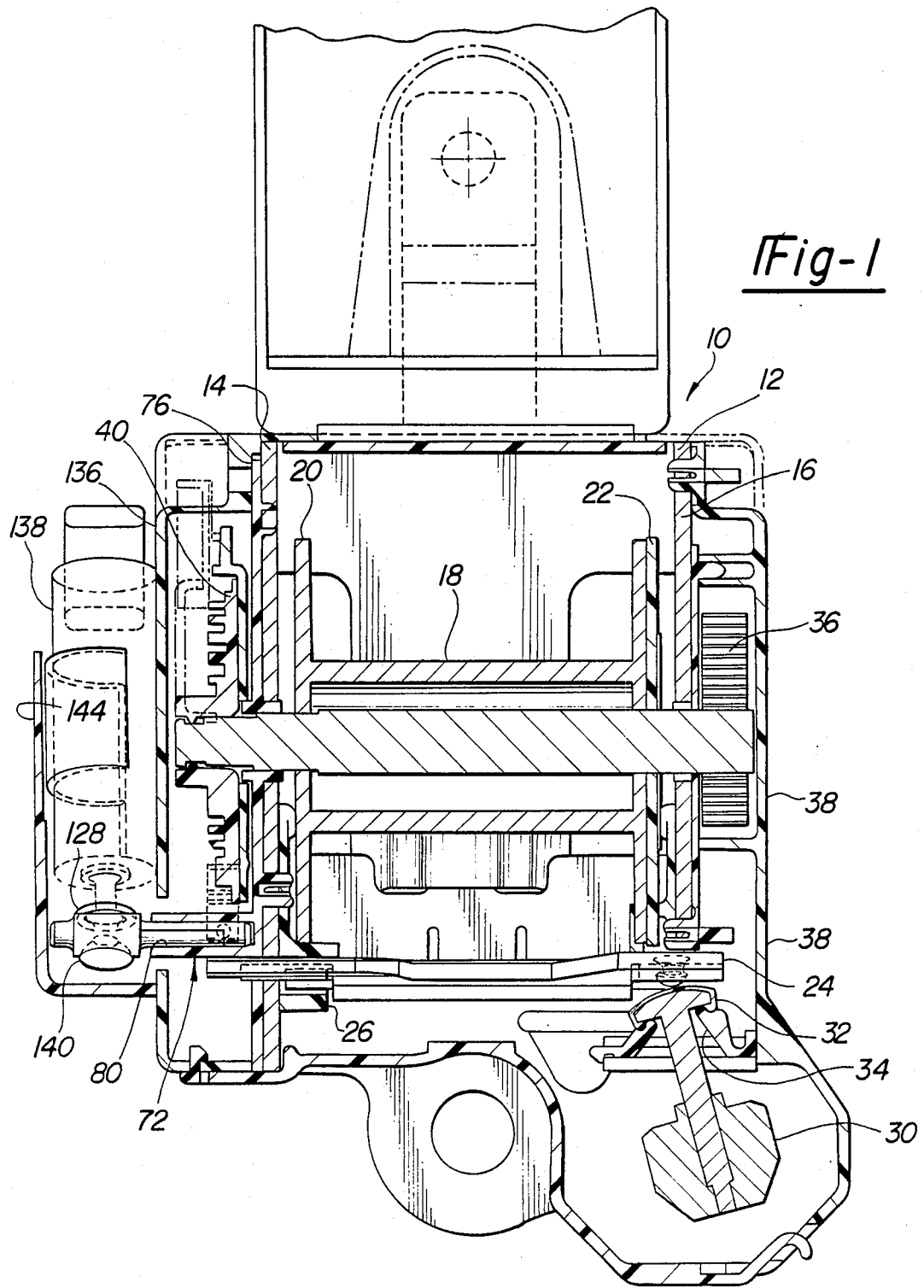
FIG. 1 is a cross-sectional view of a passive seat belt retractor assembly in accordance with this invention.
Figure 2:
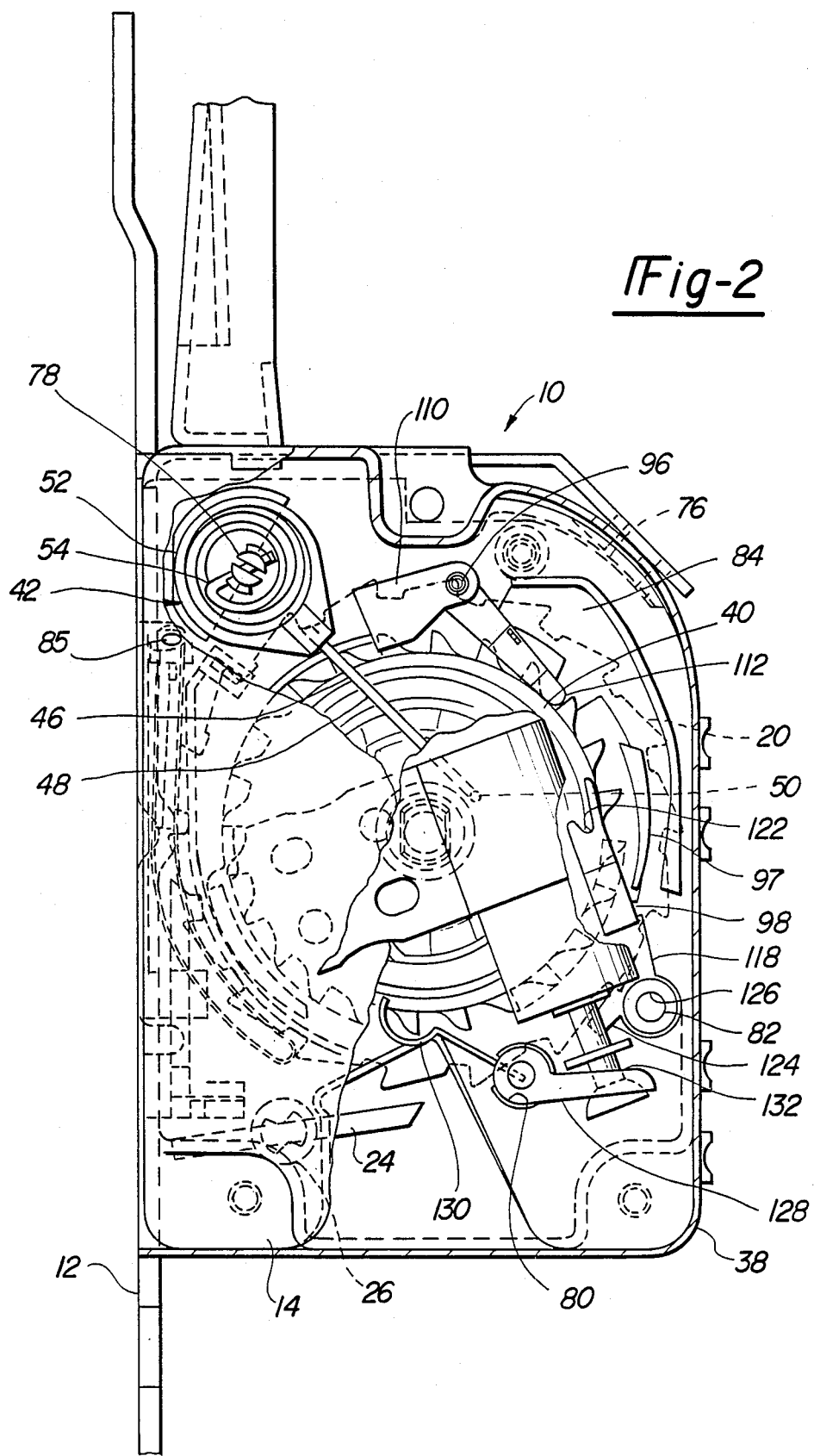
FIG. 2 is a partially cut-away frontal view of the retractor shown in FIG. 1.
Figure 3:
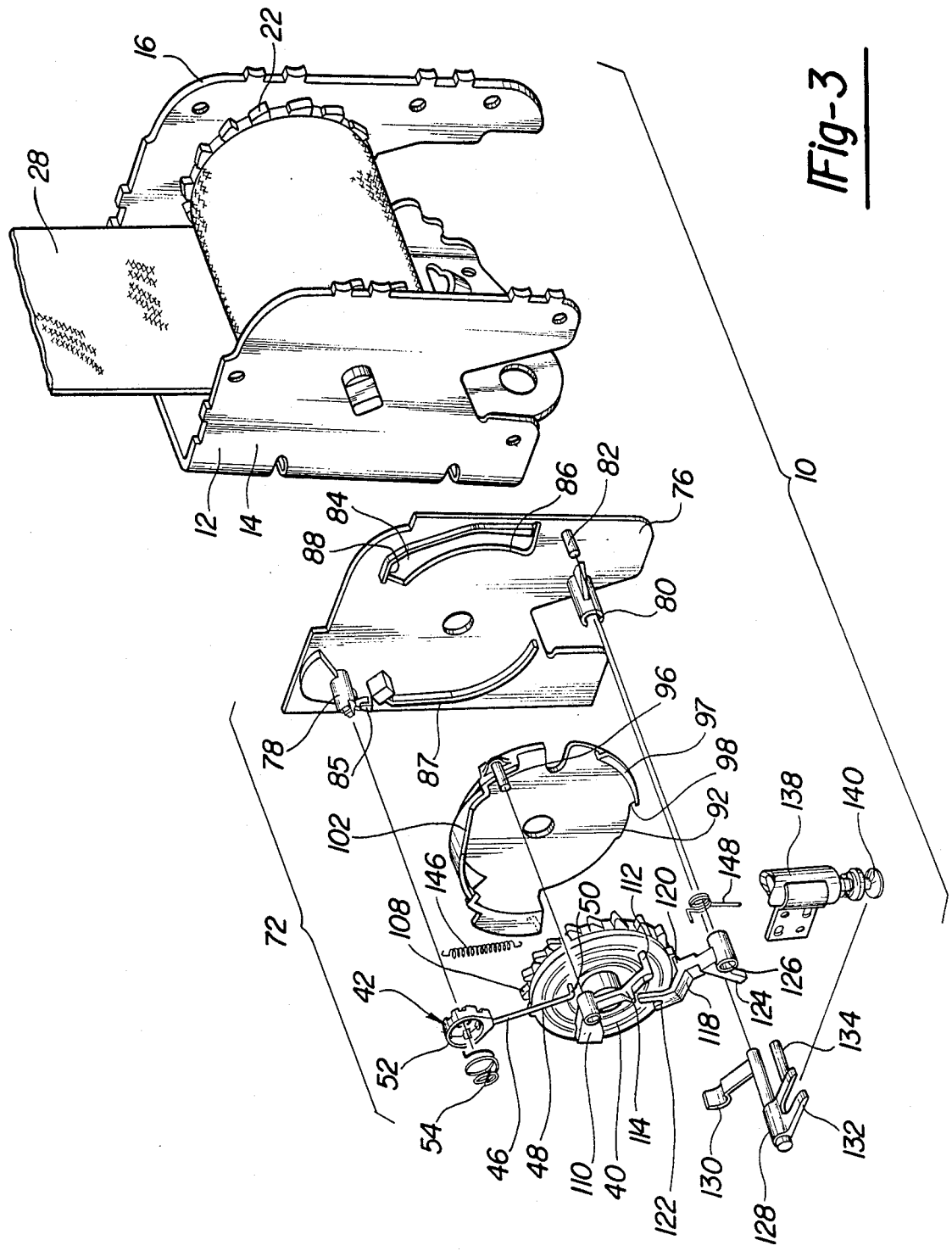
FIG. 3 is an exploded pictorial view of the retractor shown in FIG. 1.

A passive seat belt retractor assembly in accordance with this invention is shown in FIGS. 1 through 3 and is generally designated by reference number 10. Retractor assembly 10 is intended to be mounted within the front seat right-hand door of a motor vehicle and operates on the occupant's shoulder belt webbing. A separate retractor (not shown) is provided for the occupant's lap belt. Retractor assembly 10 includes retractor frame 12 having a pair of upstanding side plates 14 and 16 which support webbing spool 18 for rotation. The ends of spool 18 are formed by toothed sprockets 20 and 22 which are provided for the inertia locking mechanism of the retractor. Locking bar 24 pivots at sockets 26 from a normal position disengaged from the teeth of sprockets 20 and 22, to a position of engagement with the sprockets which inhibits continued extension of belt webbing 28. In the normal position of inertia pendulum 30, actuation head 32 nests within socket 34. In the event of a deceleration above a predetermined level, inertia pendulum 30 pivots about actuation head 32, causing the head to act on locking bar 24 urging it into engagement with sprockets 20 and 22. Rewind spring 36 acts on spool 18 to exert a retraction force on the webbing. Retractor 10 is enclosed by trim cover assembly 38.

Retractor assembly 10 further includes a so-called "comfort" mechanism which relieves the retraction force exerted on webbing 28 by rewind spring 36, for enhanced occupant comfort and convenience. The comfort mechanism is mounted on retractor frame side plate 14 and principally comprises comfort cam 40 and comfort pawl assembly 42. The comfort mechanism shown for retractor assembly 10 is generally equivalent to that described by U.S. Pat. No. 4,002,311, issued to the assignee of this application which is hereby incorporated by reference. Since the configuration and operation of the comfort mechanism of retractor 10 is explained in detail in the above referenced U.S. patent, following is an abbreviated description of the mechanism as it relates to the present invention.

Comfort pawl assembly 42 interacts with a number of grooves formed on the surface of comfort cam 40 to provide a means for eliminating belt tension. Comfort pawl assembly 42 includes stylus 46 having a radially projecting arm 48 and a bent over tip 50. Comfort pawl assembly 42 further includes spring housing 52 with coiled wire torsion spring 54. Torsion spring 54 biases stylus tip 50 in a radially inward direction with respect to spool 18, and also urges the tip axially into engagement with the grooves of comfort cam 40.

Figure 7:
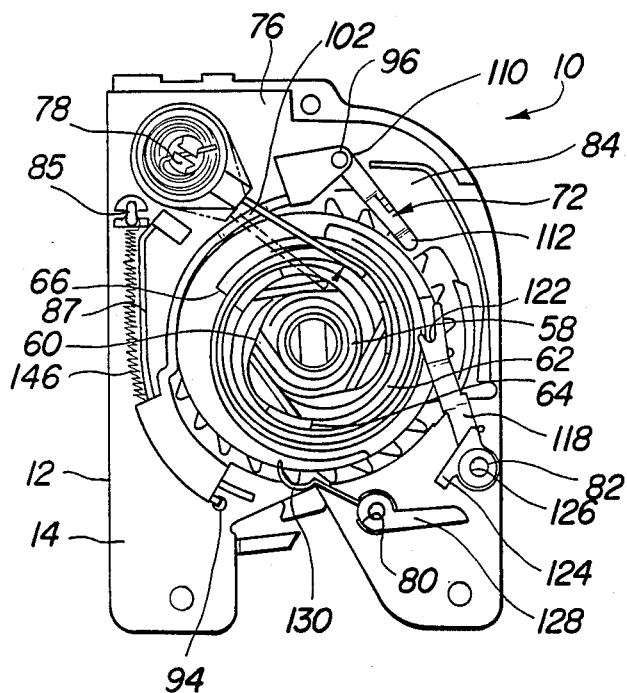
Figure 8:
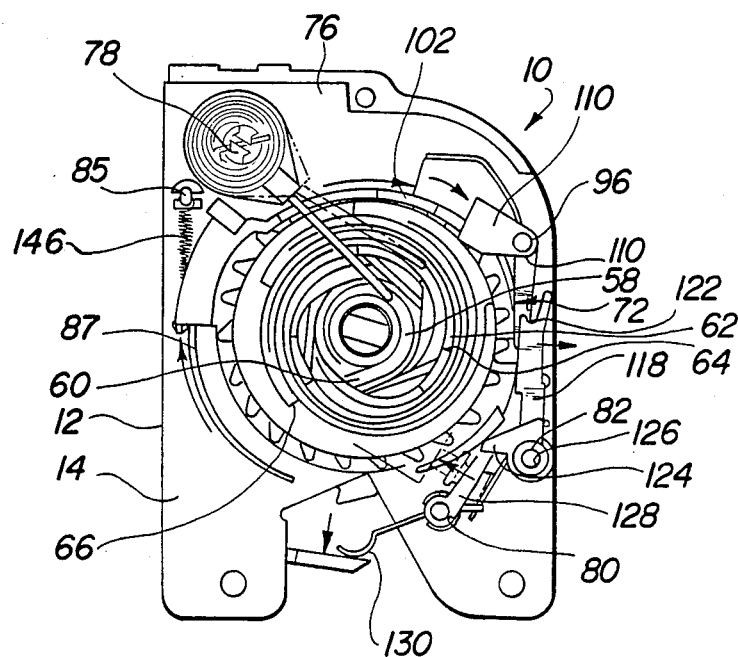

Stylus tip 50 follows various grooves of comfort cam 40 with are shown in detail in FIGS. 7 and 8. Tip 50 remains in central groove 58 during belt extension. Upon belt retraction, however, the reverse direction of rotation causes tip 50 to move from groove 58 through escape path 60 and is guided to enter one of three radially spaced engaging grooves 62, each having one or more ramped teeth 64. Upon belt retraction followed by extension, stylus tip 50 rides in one of grooves 62 and comes into engagement with one of ramped teeth 64, causing the stylus to restrain retraction of spool 18 thus relieving belt tension and setting the spool at a comfort latch position. At the radially outer end of each of engaging grooves 62, a dump ramp 66 is provided. Once a comfort position is established, it can be cancelled through withdrawal of webbing which causes stylus tip 50 to ride into dump ramp 66 which causes the tip to be raised above the axial surface of comfort cam engaging grooves 62 thus disengaging it from the grooves and returning it into central groove 58 where the above process can be repeated. Accordingly, the comfort mechanism provides a comfort position which is set by first retracting the belt and then extending it slightly, causing the stylus tip 50 to engage one of teeth 64. The feature is thereafter cancelled upon extension of the belt by more than a few inches.

As previously stated, a system is desired to cancel the inertia sensitive features of retractor 10 along with the comfort feature to enable the retractor to function properly for in-door mounted passive belt applications. In accordance with this invention, retractor operating mechanism 72 is provided which performs these functions. A description of the configuration and assembly of the elements of operating mechanism 72 will be followed with a discussion of their cooperation and operation. Operating mechanism 72 includes a number of components mounted to frame side plate 14. Base plate 76 is mounted to side plate 14 and forms post 78 for mounting comfort pawl assembly 42, and further forms shaft socket 80 and post 82. Cam aperture 84 is formed through base 76 and defines two cam surfaces, a radially inner cam surface 86, and outer cam surface 88. Plate 76 further defines spring mounting post 85 and wall 87.

Release plate 92 is placed against the outer surface of base plate 76 and is rotatable about the axis of rotation of spool 18 within a predetermined range (roughly 90°). Release plate 92 forms spring mounting post 94, lever post 96, ramp 97, and engaging surface 98. A radially outer portion of release plate 92 forms axially extending ramp surface 102.

Comfort cam 40 forms a series of radially outer sawtooth shaped teeth 108. Pawl link 110 is pivotally rotatable upon post 96 and includes engaging finger 112 which meshes with both teeth 108 and inner cam surface 86. Pawl link 110 further includes an upstanding post 114 positioned about midway between finger 112 and post 96.

Lock pawl 118 is pivotally mounted to post 82 and includes an abutment surface 120 which interacts with release plate engaging surface 98. Lock pawl 118 further includes notched end 122 which is engagable with pawl link post 114 and a short arm 124 projecting from socket 126.

Blockout lever 128 is pivotally rotatable within socket 80 and includes blockout arm 130 and actuator slot 132 with projecting arm 134.

Operating mechanism 72 is enclosed by cover 136 which provides a mounting location for actuating solenoid 138 which has a moving armature with a double flared or "hour glass" shaped actuation head 140. Solenoid 138 is mounted to cover 136 such that head 140 is entrapped within blockout lever slot 132. An additional trim cover 144 is provided which encloses solenoid 138. Coil extension sparing 146 is provided which engages posts 85 and 94. Torsional spring 148 biases lock pawl 118 in a counter-clockwise direction with respect to the orientation of elements as shown in FIGS. 4 through 8.

Figure 4:
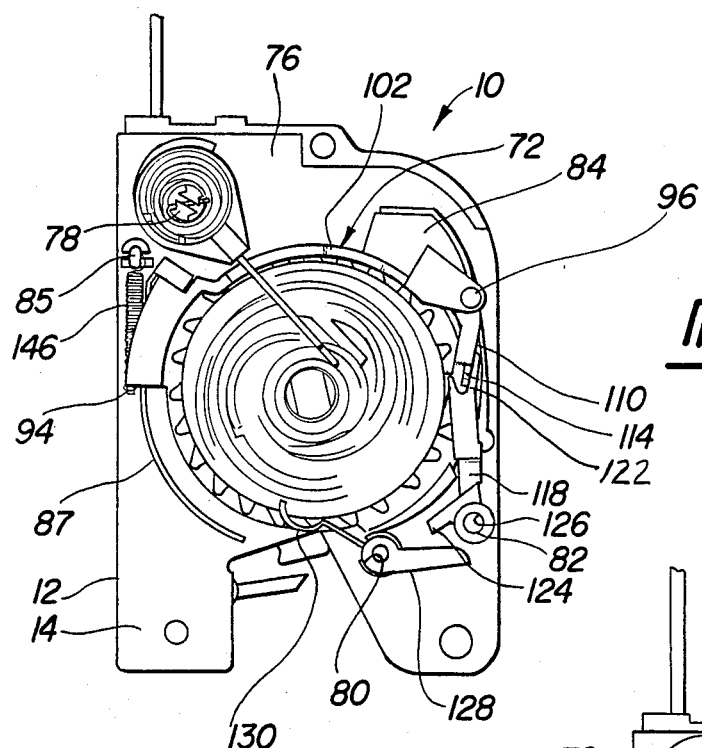
Figure 5:
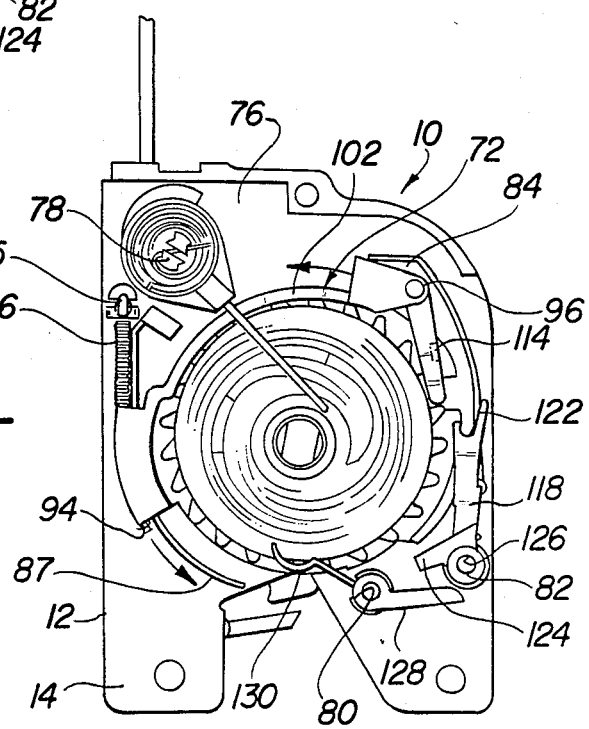
Figure 6:
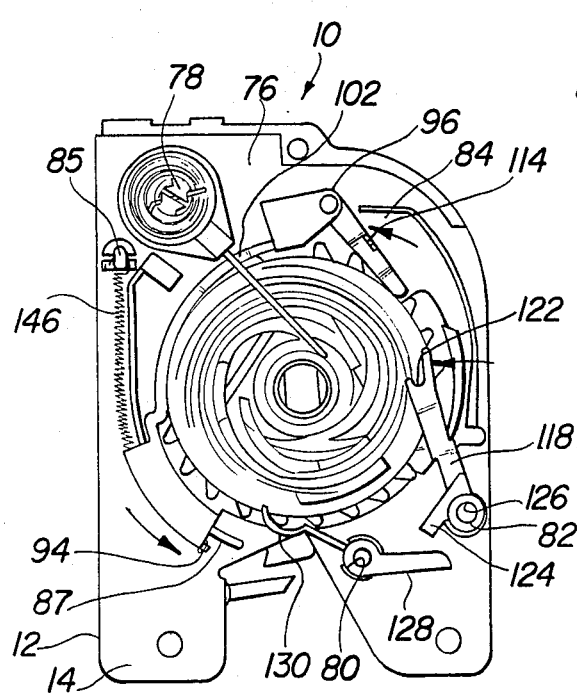

The operation of retractor assembly 10 and particularly retractor operating mechanism 72 will now be explained with reference to FIGS. 4 through 8. FIG. 4 represents the various components of retractor operating mechanism 72 in an initial state. As shown, lock pawl end 122 traps post 114 and comfort mechanism stylus tip 50 is engaging the innermost comfort cam groove 58. Assuming now that seat belt webbing 28 is substantially retracted onto spool 18, withdrawal of webbing will cause pawl link finger 112 to ratchet along teeth 108 which are formed to present a ramped surface to the finger when spool 18 is rotated in this direction. This operation occurs when the occupant is within the vehicle and exerts tension on belt webbing 28. Solenoid 138 is de-energized during this process. FIG. 5 represents the position of the elements once seat belt webbing 28 is permitted to retract while the solenoid 138 remains de-energized. In this condition, pawl link finger 112 engages one of teeth 108 shaped to engage the finger in this direction, which causes release plate 92 to rotate in a counter-clockwise direction against the tension of spring 146 until it reaches the position shown in FIG. 6. Continued rotation of the release plate 92 past the position in FIG. 6 is prevented since inside cam surface 86 acts on pawl link end 112 to disengage it from the teeth 108, and simultaneously, lock pawl abutting surface 120 is urged into engagement with release plate engaging surface 98 by spring 148, thus maintaining the release plate in the position shown in FIG. 6. In this condition, comfort pawl assembly 42 is able to operate in the previously described manner to provide the belt tension release feature. Thus, FIG. 6 represents the operational status of the components during normal driving conditions of the associated vehicle. FIG. 7 shows comfort pawl assembly 42 engaging one of ramped teeth 64 and relieving tension on seat belt webbing 28.

In the event that the associated motor vehicle door is being opened, an electrical switch (not shown) is actuated which directs power to solenoid 138, thus causing the armature to retract and forcing blockout lever 128 to be rotated in a counter-clockwise direction. This motion of blockout lever 128 has the effect of causing arm 130 to move to a position which engages inertia sensor locking bar 24 forcing it out of mesh with toothed sprockets 20 and 22 or preventing such engagement from occurring, thus rendering the inertia actuator inoperative. Blockout lever 128 also causes lever lock pawl 118 to rotate clockwise thus releasing engagement between surfaces 98 and 120, and permitting release plate 92 to rotate in a clockwise direction as shown in FIG. 8. During such motion, release plate outer cam surface 88 and wall 97 guides pawl link post 114 into engagement with lock pawl notched end 122, thus returning the elements to the position shown in FIG. 4. Simultaneously with such movement, release plate upstanding ramp surface 102 lifts stylus 46 out of engagement with the comfort cam engaging grooves 62, causing it to be moved to its innermost position and thereby cancelling the detent effect provided by the stylus. Accordingly, both the inertia sensitive and comfort features are cancelled upon energization of solenoid 138. The inertia sensitive feature remains inoperative until release plate 92 is again "wound up" to the position shown in FIG. 6, whereas the inertia sensitive feature returns upon de-energization of solenoid 138.

One significant feature of retractor assembly 10 is the ability to use a relatively small and low output solenoid 138 which may be used since it merely releases plate 92 to cancel the comfort feature. Some of the energy needed to cancel this comfort mechanism is supplied by the occupant who moves webbing 28 in a manner which "cocks" release plate 92 during normal use of the restraint system which causes energy to be stored in spring 146.

While the above description constitutes the preferred embodiments of the present invention, it will be appreciated that the invention is susceptible to modification, variation and change without departing from the proper scope and fair meaning of the accompanying claims.

We claim:

1. A seat belt retractor for providing motor vehicle occupant protection comprising:
   a rotatable spool for storing seat belt webbing,
   a rewind spring exerting a retraction force on said webbing,
   comfort means for releasing tension on said webbing exerted by said rewind spring, and
   means for cancelling said comfort means including operating means movable between a first position for acting upon and cancelling said comfort means and a second position enabling normal operation of said comfort means, biasing means urging said operating means toward said first position, actuation means for moving said operating means from said first to said second position upon rotation of said spool, release means for maintaining said operating means in said second position, and latch means for acting on said release means to release said operating means to enable said operating means to return to said first position.

2. A seat belt retractor according to claim 1 wherein said operating means comprises a rotatable release plate movable between said first and second positions.

3. A seat belt retractor according to claim 2 wherein said biasing means comprises a coil spring affixed to a frame member of said retractor and said release plate.

4. A seat belt retractor according to claim 2 wherein said comfort means comprises a stylus engagable with grooves of a cam plate and said release plate is engagable with said stylus to move said stylus out of engagement with said grooves when said operating means is in said first position.

5. A seat belt retractor according to claim 2 wherein said actuation means comprises a pawl link pivotally connected to said release plate and engagable with teeth rotatable with said spool.

6. A seat belt retractor according to claim 2 wherein said release means comprises a lock pawl rotatable to engage said release plate to maintain said release plate in said second position and movable to disengage said release plate.

7. A seat belt retractor according to claim 1, further comprising inertia sensitive means for inhibiting extension of said webbing from said retractor when said retractor is subjected to a deceleration load above a predetermined level, and an electric solenoid which acts on said latch means and said inertia sensitive means to cancel both said inertia sensitive means and said comfort means.

8. A seat belt retractor for providing motor vehicle occupant protection comprising:
   a frame for mounting to a motor vehicle structure,
   a spool for storing seat belt webbing carried for rotation by said frame,
   a rewind spring exerting a torsional loading on said spool for exerting a retraction force on said webbing,
   inertia sensitive means for preventing rotation of said spool when said retractor is subjected to a deceleration load above a predetermined level, said inertia sensitive means including a locking bar engagable with said spool,
   comfort means for relieving tension on said webbing exerted by said rewind spring, and
   retractor operating means for cancelling said inertia sensitive means to prevent engagement between said locking bar and said spool and for cancelling said comfort means to prevent said comfort means from relieving tension on said webbing, said retractor operating means including a release plate mounted for rotation to said frame, spring means coupled to said release plate and said frame, actuation means for rotating said release plate from a first to a second rotated position wherein said spring means biases said release plate toward said first position, cancelling means carried by said release plate for cancelling said comfort mechanism when said release plate is in said first position, release means for latching said release plate in said second position, latch means actuated by an electric solenoid for unlatching said release means thereby causing said release plate to move to said first position thereby cancelling said comfort means, said electric solenoid further rendering said inertia sensitive means inoperative.

9. A seat belt retractor according to claim 8 wherein said comfort means comprises a stylus carried by said retractor frame engagable with grooves formed on a comfort cam rotatable with said spool, and said cancelling means comprising a ramp surface engagable with said stylus when said release plate is in said first position to disengage said stylus from said grooves.

10. A seat belt retractor according to claim 9 wherein said actuation means includes a pawl link carried by said release plate having an arm engagable with teeth coupled to said spool for engaging with said teeth for moving said release plate from said first to said second position and said release means comprising a lock pawl having an engaging surface for latching said release plate in said second position through engagement with an abutment surface of said release plate and wherein said solenoid is coupled to said lock pawl.

11. A seat belt retractor according to claim 10 wherein said inertia sensitive means comprises a pendulum acting on said lock bar engagable with toothed sprockets of said spool and wherein said electric solenoid engages said lock bar to render said inertia sensitive means inoperative when energized.

12. A seat belt retractor for providing motor vehicle occupant protection comprising;
a frame for mounting to a motor vehicle structure,
a spool for storing seat belt webbing carried for rotation by a spool shaft journaled to said frame,
a rewind spring exerting a torsional loading on said spool for exerting a retraction force on said webbing,
inertia sensitive means for preventing rotation of said spool when said retractor is subjected to a deceleration load above a predetermined level, said inertia sensitive means including a locking bar engagable with said spool,
a comfort mechanism including a cam plate rotatable with said spool, said cam plate forming grooves on a face surface thereof, and said comfort mechanism further including a stylus coupled to said frame and having a tip engaging said grooves for relieving tension on said webbing exerted by said rewind spring, said cam plate further forming teeth projecting from its periphery, and
a retractor operating mechanism for cancelling said inertia sensitive means to prevent engagement between said locking bar and said spool, and for cancelling said comfort mechanism to prevent said mechanism from relieving tension on said webbing, said retractor operating means including a release plate mounted for rotation about said spool shaft between a first and second rotated position and having a raised edge acting on said stylus when said release plate is in said first position to prevent engagement with said grooves, spring means coupled to said release plate and said frame for biasing said release plate toward said first position, a pawl link carried for pivoting movement by said release plate and having a finger engagable with said cam plate teeth to cause said release plate to move to said second position upon retraction of said webbing, a lock pawl for latching said latch plate in said second position, a blockout lever for engaging said locking bar to prevent engagement with said toothed sprocket, and for moving said lock pawl to disengage said release plate.

13. A seat belt retractor for providing motor vehicle occupant protection comprising:
a rotatable spool for storing seat belt webbing,
a rewind spring exerting a retraction force on said webbing,
inertia sensitive means for inhibiting extension of said webbing from said retractor when said retractor is subjected to a deceleration load above a predetermined level,
comfort means for releasing tension on said webbing exerted by said rewind spring, and
comfort cancelling means for cancelling said comfort means movable between a first position cancelling said comfort means and a second position allowing said comfort means to release tension on said webbing including biasing means for urging said comfort cancelling means to said first position, actuation means for moving said comfort cancelling means to said second position, release means for maintaining said comfort cancelling means in said second position, and
drive means for acting on said inertia sensitive means to render said inertia sensitive means inoperative and for actuating said release means to cause said comfort cancelling means to move to said first position thereby cancelling said comfort means.

* * * * *